United States Patent [19]

Leiber

[11] Patent Number: 4,933,856
[45] Date of Patent: Jun. 12, 1990

[54] PROPULSION CONTROL USING LATERAL ACCELERATION AND PROPULSION CONTROL SIGNALS TO SELECT SLIP THRESHOLDS

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 942,693

[22] Filed: Dec. 17, 1986

[30] Foreign Application Priority Data

Dec. 21, 1985 [DE] Fed. Rep. of Germany ....... 3545716

[51] Int. Cl.$^5$ ................................................. B60T 8/32
[52] U.S. Cl. ............................... 364/426.01; 180/197; 303/100
[58] Field of Search ............................ 364/426, 431.07; 180/197; 361/238; 303/95, 97, 100

[56] References Cited

U.S. PATENT DOCUMENTS

| | | | |
|---|---|---|---|
| 3,930,688 | 1/1976 | Rau et al. | 364/426 |
| 4,036,536 | 7/1977 | Quon | 303/97 |
| 4,196,940 | 4/1980 | Jones | 361/238 |
| 4,321,676 | 3/1982 | Ohmori et al. | 364/426 |
| 4,420,191 | 12/1983 | Arikawa et al. | 364/426 |
| 4,439,832 | 3/1984 | Sato et al. | 364/426 |
| 4,484,280 | 11/1984 | Brugger et al. | 364/426 |

*Primary Examiner*—Gary Chin
*Attorney, Agent, or Firm*—Barnes & Thornburg

[57] ABSTRACT

A propulsion control system for motor vehicles for preventing an undesirable spinning of the driven vehicle wheels when their slip exceeds a certain threshold value, having several slip thresholds that are connected or disconnected by a logic circuit as a function of vehicle speed, the lateral acceleration and control signals of the propulsion control. The logic circuit may also be used for changing the increase and adjusting speeds of the control elements of the propulsion control, and for connecting the drive of the wheels of an additional axle and disconnecting it again directly or under certain conditions, in a delayed way.

13 Claims, 2 Drawing Sheets

PROPULSION CONTROL USING LATERAL ACCELERATION AND PROPULSION CONTROL SIGNALS TO SELECT SLIP THRESHOLDS

BACKGROUND AND SUMMARY OF THE INVENTION

The invention relates to a propulsion control system for motor vehicles to the type shown in U.S. Pat. No. 4,484,280.

It concerns a wheel slip control (ASR) for the driven wheels of a vehicle having a driven axle, a slip comparator being assigned to each of these wheels. If one driven wheel exceeds a given slip value, this wheel is braked. If both driven wheels exceed this slip value, output torque of the vehicle engine is reduced. In one variation, the torque is reduced if only one drive wheel is spinning.

Because of the fixed slip threshold value, a wheel slip control occurs earlier than required. As a result of the differing rotational speeds of the vehicle wheels during turning, these slip values are reached much earlier than in the case of straight-ahead driving. Also, the road condition and the relationship between the road and the vehicle are not taken into account.

It is therefore the objective of the invention to improve the known system to the extent that the slip threshold values are adapted better to the momentary conditions, the control is refined and as a result the safe driving range is expanded.

According to the invention, this objective is achieved by providing several slip threshold comparators having different threshold values and selecting one of the slip threshold comparators by a logic circuit as a function of lateral acceleration and control signals of the propulsion system.

While the fixing of the slip threshold value in the case of the known system represents a compromise between an optimal propulsion force and the best cornering force or lateral control force, the slip threshold values in the case of the system according to the invention, during straight-ahead driving (low lateral acceleration), are selected for an optimum propulsion force, and during cornering (moderately high to high lateral acceleration while taking the driving speed into account), said slip threshold values are selected for a good cornering force or lateral control force.

The lateral acceleration signal is used as the control signal for the fixing of the thresholds and results in an effect on the logical processes which will then change the control means for affecting the braking and engine torque. In comparison to a fixed slip threshold, this represents a significant improvement of the system.

The signals obtained in the logic circuit may, in a simple way, be used for switching an additional all-wheel drive (driving of the wheels of an additional axle) and will thus further increase safety. Advantageously, these signals may also be used for varying the speed of the rising of the brake pressure for the wheel brakes and the adjusting speed of the power control element so that the intervention carried out by the system with respect to the brakes and the drive becomes less noticeable.

Other objects, advantages and novel features of the present invention will become apparent from the following detailed description of the invention when considered in conjunction with the accompanying drawings.

DETAILED DESCRIPTION OF THE DRAWINGS

Figure 1:
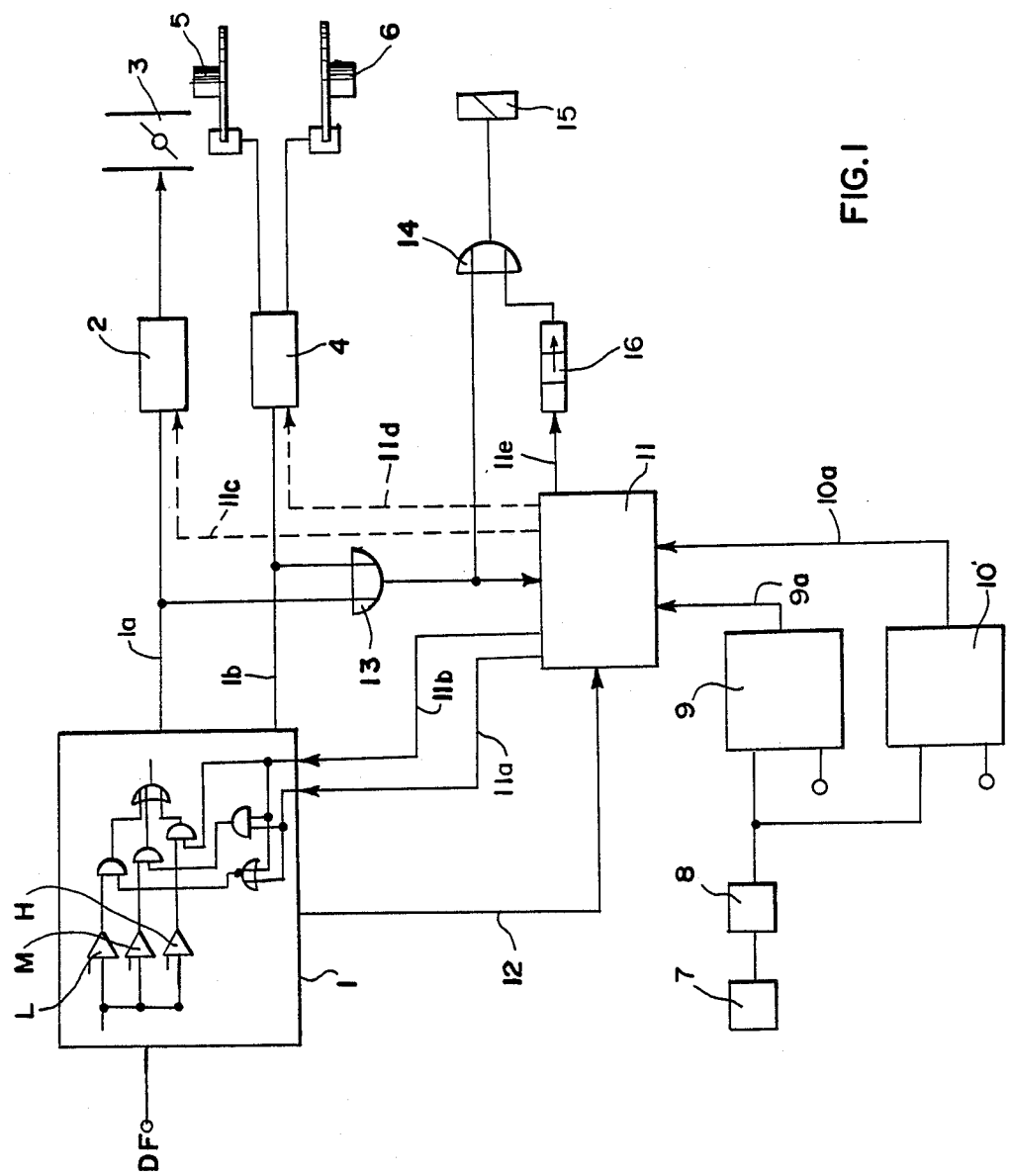
FIG. 1 is a block diagram of a propulsion control system incorporating the principles of the present invention.

In FIG. 1, the known wheel slip control system is shown in diagram form and only to the extent that it is required for being understandable. The box 1 receives as input signals the wheel speed signals determined by wheel speed sensors DF. The electronic system for the wheel slip control ("ASR") is housed in box 1, unless, as described in the following, it is shown separately. An output signal affects a torque control means 2 that, in the sense of a power reduction, affects the control element, in this case shown as a throttle valve 3, of the vehicle engine that is not shown.

Another output signal affects a braking torque regulator 4 that controls the braking force at the driven wheels 5 and 6 that tend to spin.

It is assumed that the method of operation of the ASR is known. It is described in detail in U.S. Pat. No. 4,484,280.

The lateral acceleration sensor 7, a low-pass filter 8, and the lateral acceleration comparator 9 are part of the electronic system of the ASR and known per se. Connected in parallel with the lateral acceleration comparator 9 is a second lateral acceleration comparator 10 that is set at a higher threshold value. The filtered output signal of the lateral acceleration sensor 7 is fed to both comparators as the input signal. The output signals 9a and 10a of the two lateral acceleration comparators 9 and 10 are fed to a logic circuit 11 that is only shown in diagram form as a box.

This logic circuit 11 receives an output signal of a driving speed comparator contained in the ASR electronic system 1 via a line 12 and a signal that is called an "ASR-signal" via an OR-gate 13. The OR-gate, via its inputs, is connected with the lines 1a and 1b carrying the output signals of the ASR electronic system and will generate an output signal in every case that a control signal is present for the engine torque regulator 2 or the braking torque regulator 4.

The output signal of the OR-gate 13 is also used for actuating a control element 15, via another OR-gate 14, by means of which an all-wheel drive, more precisely, the drive of the wheels of an additional axle, is connected. By means of the ASR-signal, this will always take place when a control signal is present for the engine torque regulator or the braking regulator, thus when at least one of the previously driven wheels has excessive slip.

According to the above, the logic circuit 11 receives a driving speed signal on line 12, if an indicated driving speed threshold value is exceeded, a first lateral acceleration signal 9a if the threshold value indicated to the comparator 9 is exceeded, a second lateral acceleration signal 10a, if the higher threshold value indicated to the comparator 10 is exceeded, and the ASR-signal from the OR-gate 13 if an engine or braking control signal is present.

Figure 2:
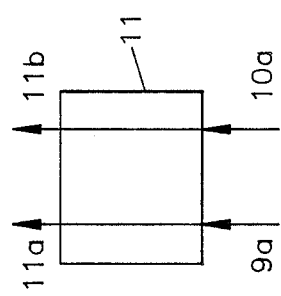
FIG. 2 is a logic diagram of the control logic 11.

In the case of a simple construction of the logic circuit 11 as illustrated in FIG. 2, the output signals of the lateral acceleration comparators 9 and 10 cause the switching of the: slip thresholds in the ASR electronic system 1 directly without intervening logic. Of the three slip comparators per driven wheel that are shown as H, M, L, the slip comparator L with the lowest slip threshold will be operative when no lateral acceleration signal is present. This would be the case, for example in straight-ahead driving. If the comparator 9 carries an output signal 9a (low to moderate lateral acceleration), instead of the first comparator L, now the second slip comparator M having the higher slip threshold will be actuated via the line 11a. If, in the case of a high lateral acceleration, an output signal 10a occurs from comparator 10, this comparator 10 switches off the second slip comparator M and instead the third comparator H having the highest slip threshold will be actuated via the line 11b.

Figure 3:
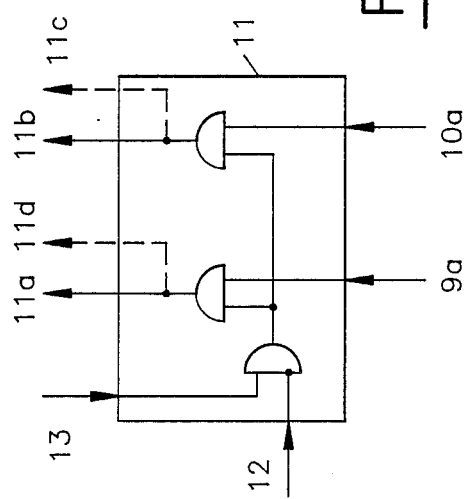
FIG. 3 is a logic diagram of a more sophisticated embodiment of the control logic 11.

In the case of a costly construction of the logic circuit 11 of FIG. 3, it may, for example, include an actuating of the slip comparators in the case of a corresponding lateral acceleration signal, will take place 10 only if at the same time an ASR-signal and/or no signal of the driving speed comparator (low speed below the indicated threshold) is present. The logic circuit can be made by simple logic control elements.

These output signals in one of the just indicated combinations may also be used for switching the braking pressure in the wheel brakes 5 and 6 as well as the rate of adjusting speed of the power control element 3 of the vehicle engine in a way that is similar to the already described switching of the slip thresholds in order to be able to better adapt these to momentary conditions. In the drawing, these signals are shown by interrupted lines 11c and 11d, that start from the logic circuit 11 and affect the engine torque regulator 2 and the braking torque regulator 4.

Figure 4:
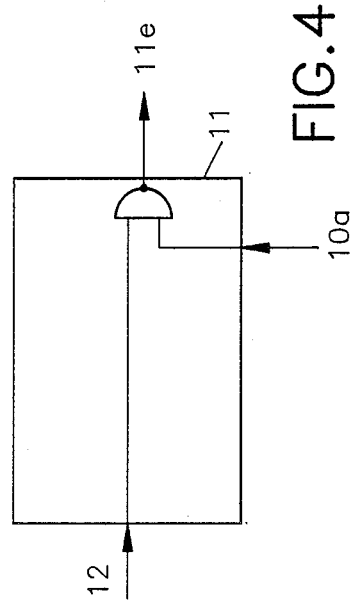
FIG. 4 is a logic diagram of the embodiment of the control logic for the delay of the all-wheel drive signal.

It is not always advantageous to only connect the all-wheel drive as long as an ASR-signal is present. In the case of certain driving concepts, for example, in the case of an all-wheel drive without a central differential gear, it is advantageous, particularly in the case of low lateral accelerations, to delay the disconnecting of the all-wheel drive in order to avoid pendulum switching. For this purpose, an additional logical switching element, shown in FIG. 4, is provided in the logic circuit 11, the output signal 11e of which affects a monostable time function element 16 and actuates it in the case of the particular condition, starting with the fall of the ASR-signal, for an indicated time period. Its output signal, via the OR-gate 14, affects the control element 15, prolonging its control duration.

It may also be advantageous to not carry out this disconnection delay if, for example, no driving speed signal (low driving speed) and at the same time a high lateral acceleration (narrow turn), are present. This may be carried out in a simple way by an additional logic control element (not shown) that is used as a gate element for the signal 11e.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a propulsion control system for a motor vehicle for preventing an undesireable spinning of the driven vehicle wheels, having a plurality of sensor means for providing signals indicative of the speed of the vehicle wheels, having slip means for determining the slip of the driven vehicle wheels from the signals of said sensor means, having a first slip comparator means for each driven vehicle wheel for comparing the driven wheel speed to an indicated threshold value and providing an output signal when the threshold is exceeded, having means for actuating a control element to reduce the output torque of an engine of the vehicle in response to an input signal indicative of at least one of the driven wheels of the vehicle tend to spin, having a vehicle speed comparator means for comparing vehicle speed to a second indicated threshold value and providing an output signal when the second threshold is exceeded, having a means for measuring the lateral acceleration of the vehicle, a first lateral acceleration comparator means for comparing said lateral acceleration to a third indicated threshold value and providing an output signal when the third threshold is exceeded, the improvement comprising:

at least a second lateral acceleration comparator means for comparing said lateral acceleration to a first indicated additional threshold value and providing an output signal when the first additional threshold is exceeded, for each driven vehicle wheel, at least one additional slip comparator means for comparing said driven wheel speed to a second additional indicated threshold value and providing an output signal when the second additional threshold is exceeded, and logic means for enabling at least said additional slip comparator means instead of the first slip comparator in response to a predetermined combination of said output signal of the vehicle speed comparator means, said output signal from said lateral acceleration comparator means and said input signal to the actuating means for the control element affecting the engine output torque.

2. A system according to claim 1, wherein said logic means enables the additional slip comparator means when one of said first and second lateral acceleration comparator provides an output signal.

3. A system according to claim 1, wherein said logic means enables the additional slip comparator means when one of said first and second lateral acceleration comparator means provides an output signal and said actuating means receives said input signal simultaneously.

4. A system according to claim 1, wherein said logic means enables the additional slip comparator means when one of said first and second lateral acceleration comparator means and the vehicle speed comparator means provide output signals simultaneously.

5. A system according to claim 1, wherein said logic means enables the additional slip comparator means when one of said first and second lateral acceleration comparator means and the vehicle speed comparator means provide output signals and said actuating means receives said input signal simultaneously.

6. A system according to claim 1, wherein said logic means includes all-wheel logic means for actuating a control element of a connectable all-wheel drive when said actuating means receives said input signal.

7. A system according to claim 6, wherein said all-wheel logic means includes delay means for delaying deactivating of the connectible all-wheel drive.

8. A system according to claim 7, wherein said all-wheel logic means includes means for disabling said delay means when one of said first and second lateral acceleration comparator means emits an output signal that is significantly higher with respect to high lateral acceleration and the vehicle speed comparator means emits an output signal that is significantly lower with respect to low vehicle speed.

9. A system according to claim 1, including:
means for actuating the wheel brake of individual driven vehicle wheels that tend to spin; and
said logic means selectively enables one of said first and said additional slip comparators per driven vehicle, if, in addition to the input signal to the actuating means for the control element affecting the engine torque, an input signal to the actuating means for the wheel brakes of the driven vehicle wheels is present.

10. A system according to claim 9, wherein said logic means enables the additional said slip comparator means when one of said first and second lateral acceleration comparator means provides an output signal and at least one of said actuating means receives said input signal simultaneously.

11. A system according to claim 9, wherein said logic means enables the additional slip comparator means when one of said first and second lateral acceleration comparator means and the vehicle speed comparator means provide output signals and at least one actuating means receives said input signal simultaneously.

12. A system according to claim 9, wherein said logic means includes all-wheel logic means for actuating a control element of a connectable all-wheel drive when at least one actuating means receives said input signal.

13. A system according to claim 9, wherein said logic means includes means for changing the rate of the brake pressure change in the wheel brakes as well as the rate of adjusting the power control element of the vehicle engine.

* * * * *